Figure 1:
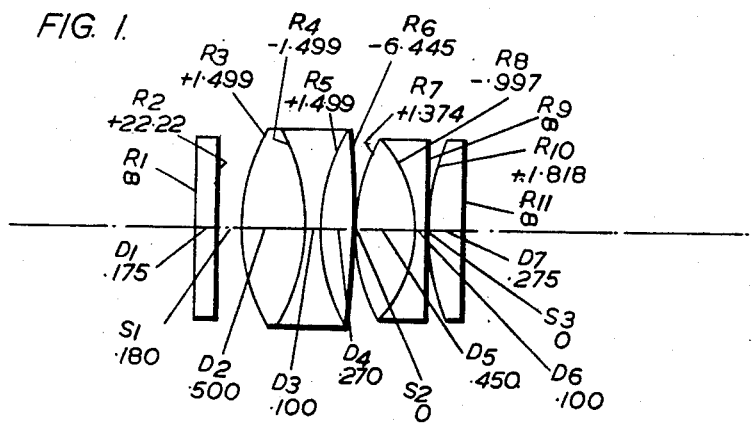

May 12, 1953   W. M. WREATHALL   2,638,034
THREE CONVERGENT COMPONENT OPTICAL OBJECTIVE
Filed July 16, 1951                           2 Sheets-Sheet 1

Inventor
William M. Wreathall
By
Emery, Holcombe & Blair
Attorney

May 12, 1953 W. M. WREATHALL 2,638,034
THREE CONVERGENT COMPONENT OPTICAL OBJECTIVE
Filed July 16, 1951 2 Sheets-Sheet 2

Inventor
William M. Wreathall
By
Attorney

Patented May 12, 1953

2,638,034

UNITED STATES PATENT OFFICE 2,638,034

THREE CONVERGENT COMPONENT OPTICAL OBJECTIVE

William Michael Wreathall, Leicester, England, assignor to Taylor, Taylor & Hobson Limited, Leicester, England, a British company Application July 16, 1951, Serial No. 236,949
In Great Britain July 17, 1950

13 Claims. (Cl. 88—57)

This invention relates to an optical objective, corrected for spherical and chromatic aberrations, coma and astigmatism and having a curved short-conjugate field, for projection or other purposes, and is concerned more particularly with a development of the invention forming the subject of U. S. A. Patent No. 2,502,543, dated April 4, 1950. The objective of such patent was primarily designed for use for the optical projection on to a screen of the images formed by electrical scanning on suitable targets in cathode ray tubes, as used for television purposes.

For this purpose, the objective according to the invention of such patent is corrected for spherical and chromatic aberrations, coma and astigmatism and comprises two members separated by an air space lying between 0.6 and 1.2 times the equivalent focal length of the rear member, the rear member consisting of three convergent achromatic doublets and having an overall axial length between .50 and .85 times such equivalent focal length, whilst the front member consists of a simple element having one surface slightly aspherical.

It should be made clear that the terms "front" and "rear" are herein used, in accordance with the usual convention, to relate to the sides of the objective respectively nearer to and further from the longer conjugate, so that when used for projection the light passes through the objective from the rear to the front.

For the television projection purposes, for which such invention was primarily developed, the focal length of the objective would usually be of the order of 5 to 12 inches and the semi-angular field covered would be, say, 17½ degrees.

The present invention is concerned with a development of such prior invention to make it suitable for use for apparatus other than television purposes, and especially for miniature radiographic cameras, for which a focal length as short as 2 inches and a semi-angular field of about 22½ degrees would be required, and for which a wider aperture and much greater light transmission are desirable.

To this end, according to the present invention, the objective comprises two members separated by an air space whose axial length lies between zero and .8 F (where F is the equivalent focal length of the rear member), the rear member having an overall axial length between 1.1 F and 2.2 F and comprising at least three convergent components of which the front component is of triplet form having a divergent element between two convergent elements, whilst the front member consists of a simple element having one surface slightly aspherical, the most deeply curved of the internal contacts in the rear member having a radius of curvature between .7 F and 1.5 F.

The term "internal contact" is used herein to denote the assemblage of the two cooperating surfaces between two elements of a compound component, whether or not such surfaces are cemented together and whether or not such surfaces have exactly the same radius of curvature. When the two cooperating surfaces have slightly different radii of curvature, the radius of curvature of the internal contact is to be taken as the harmonic mean between the two radii of curvature.

The aspherical surface of the simple front member is constituted by a surface of revolution generated by the rotation about the $x$-axis, that is the optical axis of the objective, of a curve of the form $x = ay^2 + by^4 + cy^6 + \ldots +$ higher even powers of $y$, wherein the coefficients $a, b, c \ldots$ are constants and determine the degree of departure of the surface from true spherical form, the term "spherical" being used to include a sphere of infinite radius, that is a plane surface. It will, in fact, often be convenient in practice for the aspercial surface to consist of a figured plane surface, the figuring (that is, the departure of the surface from the true plane) being small at all radial distances from the axis. Thus the asphericity should usually be such that at no point does the departure from the osculating sphere at the vertex exceed .06 times the equivalent focal length of the rear member.

In the neighborhood of the optical axis, the optical power of the front member is preferably less than one quarter of that of the rear member.

The objective is preferably such that its short-conjugate field corresponding to a flat long-conjugate field is spherically curved and concave towards the objective with radius of curvature between 1.0 F and 2.0 F. When the objective is used for photographic purposes, it is convenient to provide an additional element behind the objective with its rear surface shaped and positioned to correspond to the short-conjugate field, to afford a surface against which a photographic film can be pressed.

The Abbé V number of the material of each convergent elements in the rear member is preferably greater than 52, and the Abbé V number of the material of each divergent element in the rear member is preferably less than 38.

The Abbé V number of the material of the front member exceeds 45.

The rear member may take various forms. Thus, the front component of the rear member may consist of a convergent triplet having a divergent element between two convergent elements, and in such case the rear member may have behind such triplet two convergent doublets or one convergent doublet and a simple component, each convergent doublet consisting of a convergent element in front of a divergent element.

The front surfaces of the components of the rear member are preferably all convex to the front.

Figure 2:
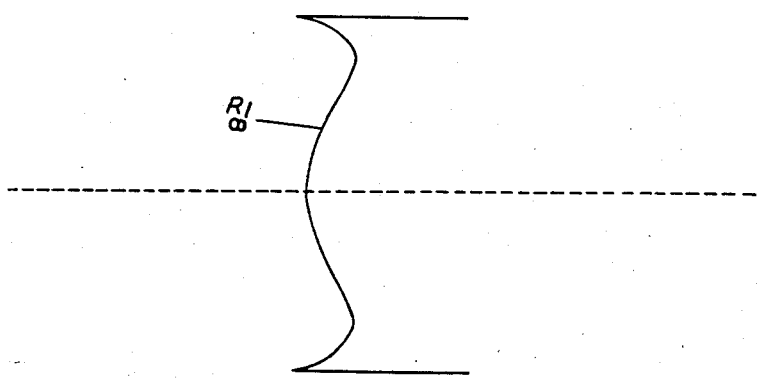
Figure 3:
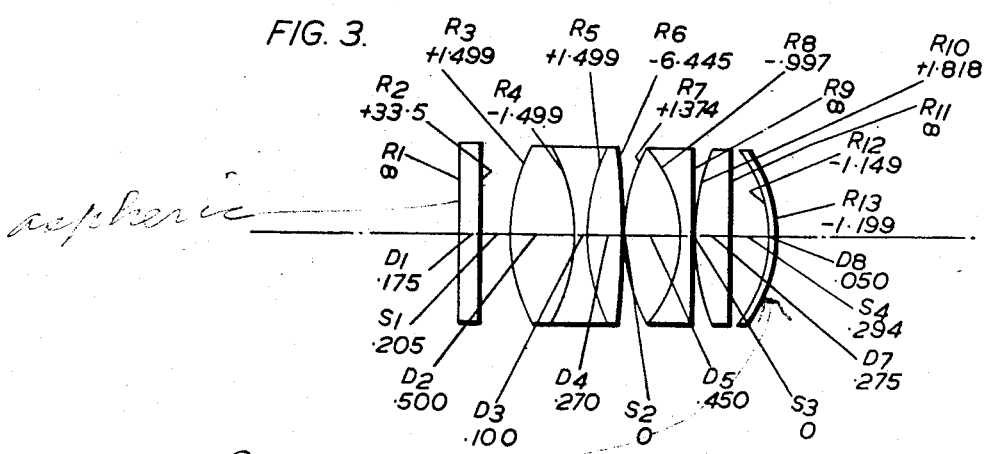
Figure 4:
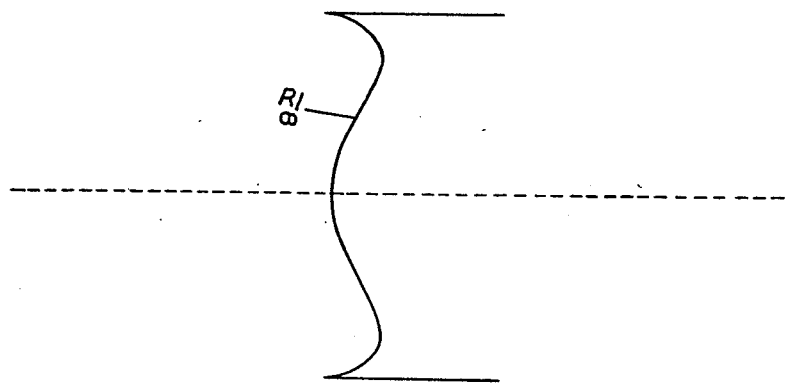
Figure 5:
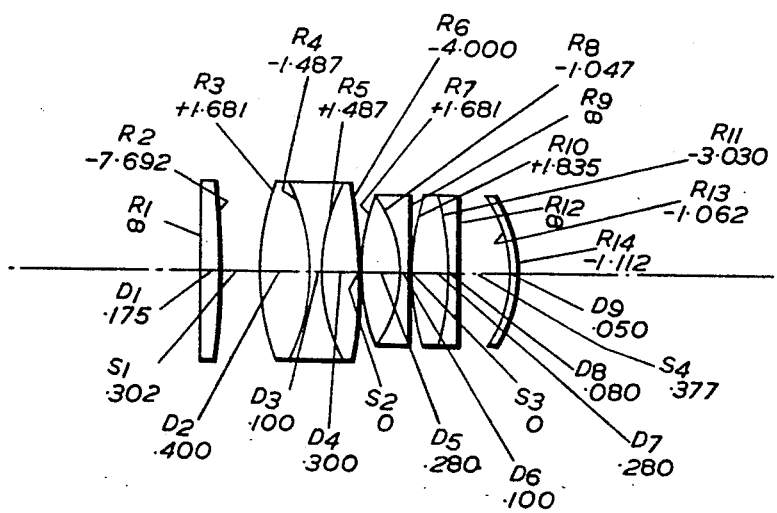

Some convenient practical examples of objective according to the invention are illustrated in the accompanying drawings, in which Figure 1 shows one such example, Figure 2 is an enlarged view of the aspherical front surface of the objective shown in Figure 1, with the horizontal scale of the drawing greatly exaggerated to give an indication of the shape of the surface, such scale being roughly twenty times the vertical scale of the drawing, Figures 3 and 4 are views similar to Figures 1 and 2 of a modification of the example shown therein, and Figure 5 shows a further example.

Numerical data for these examples are given in the following tables, in which $R_1 R_2 \ldots$ represent the radii of curvature of the individual surfaces counting from the front, the positive sign indicating that the surface is convex to the front and the negative sign that it is concave thereto, $D_1 D_2 \ldots$ represents the axial thicknesses of the individual elements, and $S_1 S_2 \ldots$ represent the axial air separations between the components. The table also gives the mean refractives indices $n_D$ for the D-line and the Abbé V numbers of the materials used for the various elements. The shape of the aspherical surface is defined in two of the examples by the equation to its generating curve and in the third example by tabulating the coordinates of such curve, the $x$-coordinate in each case representing the radial distance from the optical axis and the $y$-coordinate the distance in the direction of the optical axis from the transaxial plane through the vertex of the surface towards the rear of such plane. In all the examples the dimensions are given in terms of the equivalent focal length of the rear member which is taken as unity.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a redius indicated for example as positive in the tables may have to be treated as negative for some calculations as is well understood in the art.

These examples are especially useful for photographic purposes as for example for radiographic cameras, and in such use it is convenient to employ a register plate consisting of a simple element whose rear surface is located in the image position and is shaped to the curvature of the image surface of the objective, so that the photographic film can be pressed into contact with such plate. Such register plate may be used, if desired, to assist in the corrections of the objective. Example II differs from Example I solely in the use of a register plate in this way.

All the examples give a wide aperture and a high light transmission of the order of twice that of the example described in U. S. Patent Specification No. 2,502,543 referred to above.

*Example I*

| Radius | Thickness or Air Separation | Refractive Index $n_D$ | Abbé V Number |
|---|---|---|---|
| $R_1$ = Aspherical surface | $D_1$ = .175 | 1.6123 | 58.5 |
| $R_2$ = +22.22 | $S_1$ = .180 | | |
| $R_3$ = +1.499 | $D_2$ = .500 | 1.6123 | 58.5 |
| $R_4$ = −1.499 | $D_3$ = .100 | 1.6132 | 36.9 |
| $R_5$ = +1.499 | $D_4$ = .270 | 1.6123 | 58.5 |
| $R_6$ = −6.445 | $S_2$ = 0 | | |
| $R_7$ = +1.374 | $D_5$ = .450 | 1.6123 | 58.5 |
| $R_8$ = −.997 | $D_6$ = .100 | 1.6132 | 36.9 |
| $R_9$ = ∞ | $S_3$ = 0 | | |
| $R_{10}$ = +1.818 | $D_7$ = .275 | 1.6123 | 58.5 |
| $R_{11}$ = ∞ | | | |

Coordinates of aspherical surface $R_1$:

| $y$ | $x$ | $y$ | $x$ |
|---|---|---|---|
| 0 | .00000 | .4652 | +.00877 |
| .0676 | +.00029 | .5278 | +.00910 |
| .1351 | +.00112 | .5761 | +.00840 |
| .2024 | +.00243 | .6218 | +.00655 |
| .2692 | +.00407 | .6638 | +.00321 |
| .3354 | +.00584 | .6992 | −.00148 |
| .4010 | +.00752 | | |

In this example, illustrated in Figures 1 and 2, the short-conjugate field has radius of curvature 1.192 F concave towards the objective and is axially distant .327 F behind the surface $R_{11}$. The long-conjugate field is flat at distance 19.84 F in front of the surface $R_1$, the magnification of the objective being ×19.82. The optical power of glass with Abbé V Number 36.9. The most deeply cal axis is .050 times that of the rear member. The numerical aperture of the objective is .7.

The rear member in this example consists of a convergent triplet having a divergent element between two convergent elements, in front of a convergent doublet having a convergent element in front of a divergent element, followed by a convergent simple component. The overall axial length of the rear member is 1.695 F. The four convergent elements are made of the same glass having Abbé V Number 58.5, and the two divergent elements are likewise made of the same glass with Abbé V number 36.9. The most deeply curved of the three internal contacts is in the middle doublet component and has radius of curvature .997 F concave to the front.

Example II

| Radius | Thickness or Air Separation | Refractive Index $n_D$ | Abbé V Number |
|---|---|---|---|
| $R_1$ = Aspherical surface | $D_1$ = .175 | 1.6123 | 58.5 |
| $R_2$ = +33.50 | $S_1$ = .205 | | |
| $R_3$ = + 1.499 | $D_2$ = .500 | 1.6123 | 58.5 |
| $R_4$ = − 1.499 | $D_3$ = .100 | 1.6132 | 36.9 |
| $R_5$ = + 1.499 | $D_4$ = .270 | 1.6123 | 58.5 |
| $R_6$ = − 6.445 | $S_2$ = 0 | | |
| $R_7$ = + 1.374 | $D_5$ = .450 | 1.6123 | 58.5 |
| $R_8$ = − .997 | $D_6$ = .100 | 1.6132 | 36.9 |
| $R_9$ = ∞ | $S_3$ = 0 | | |
| $R_{10}$ = + 1.818 | $D_7$ = .275 | 1.6123 | 58.5 |
| $R_{11}$ = ∞ | $S_4$ = .294 | | |
| $R_{12}$ = − 1.149 | $D_8$ = .050 | 1.524 | 54.5 |
| $R_{13}$ = − 1.199 | | | |

Coordinates of aspherical surface $R_1$:—

| $y$ | $x$ | $y$ | $x$ |
|---|---|---|---|
| 0 | .00000 | .4652 | +.00896 |
| .0676 | +.00029 | .5278 | +.00943 |
| .1351 | +.00112 | .5761 | +.00886 |
| .2024 | +.00243 | .6218 | +.00717 |
| .2692 | +.00409 | .6638 | +.00402 |
| .3354 | +.00589 | .6992 | −.00049 |
| .4010 | +.00763 | | |

This example, shown in Figures 3 and 4, differs from Example I solely in a modification of the shape of the front member and its spacing from the rear member to accommodate a slightly divergent simple element constituting a register plate behind the rear member. The short-conjugate field has radius of curvature 1.199 F concave towards the objective and coincides with the rear surface $R_{13}$ of the register plate. The long-conjugate field is flat at distance 16.77 F in front of the surface $R_1$ and the magnification is ×16.49. The optical power of the front member in the neighbourhood of the axis is .060 times that of the rear member. In other respects the example is identical with Example I.

Example III

| Radius | Thickness or Air Separation | Refractive Index $n_D$ | Abbé V Number |
|---|---|---|---|
| $R_1$ = Aspherical surface | $D_1$ = .175 | 1.613 | 58.5 |
| $R_2$ = −7.692 | $S_1$ = .302 | | |
| $R_3$ = +1.681 | $D_2$ = .400 | 1.613 | 58.5 |
| $R_4$ = −1.487 | $D_3$ = .100 | 1.613 | 36.9 |
| $R_5$ = +1.487 | $D_4$ = .300 | 1.613 | 58.5 |
| $R_6$ = −4.000 | $S_2$ = 0 | | |
| $R_7$ = +1.681 | $D_5$ = .280 | 1.613 | 58.5 |
| $R_8$ = −1.047 | $D_6$ = .100 | 1.613 | 36.9 |
| $R_9$ = ∞ | $S_3$ = 0 | | |
| $R_{10}$ = +1.835 | $D_7$ = .280 | 1.613 | 58.5 |
| $R_{11}$ = −3.030 | $D_8$ = .080 | 1.613 | 36.9 |
| $R_{12}$ = ∞ | $S_4$ = .377 | | |
| $R_{13}$ = −1.062 | $D_9$ = .050 | 1.524 | 54.7 |
| $R_{14}$ = −1.112 | | | |

The coordinates of the aspherical surface $R_1$, are determined by the equation $$x = .0630y^2 - .1206y^4 + \text{higher order terms}$$

In this example, shown in Figure 5, the short-conjugate field is concave towards the objective with radius of curvature 1.112 F and coincides with the rear surface $R_{14}$ of the register plate, which is in the form of a simple element. The long-conjugate field is flat at distance 6.35 F in front of the surface $R_1$, the magnification of the objective being ×6.4.

The aspherical surface $R_1$ is slightly convex to the front at the vertex with radius of curvature 7.941 F, and the optical power of the front member in the neighbourhood of the axis is .156 times that of the rear member. The numerical aperture of the objective is 0.70.

The rear member in this example is similar to that of Examples I and II, except that the rear simple component is replaced by a convergent doublet having a convergent element in front of a divergent element. The most deeply curved of the four internal contacts is in the doublet middle component and has radius of curvature 1.047 F concave to the front. The overall axial length of the rear member is 1.917 F.

In all the foregoing examples, the overall curvature of the aspherical surface on the front member may be varied, if desired, in a manner analogous to that described in the specification of U. S. A. Patent No. 2,479,907, dated August 23, 1949, to give substantially the same degree of correction for the objective working at slightly different conjugates and with slightly different separations between the front and rear members.

It is to be understood that the foregoing examples are given by way of example only and that the invention may be carried into practice in other ways.

What I claim as my invention and desire to secure by Letters Patent is:

1. An optical objective corrected for spherical and chromatic aberrations, coma and astigmatism and having a curved short-conjugate field, and comprising a rear member having an overall axial length between 1.1 F and 2.2 F, where F is the equivalent focal length of the rear member, and consisting of at least three convergent components, of which the front component is of triplet form having a divergent element between two convergent elements, the most deeply curved of the internal contacts in the rear member having a radius of curvature between .7 F and 1.5 F, and a front member separated from the rear member by an air space whose axial length lies between zero and .8 F and consisting of a simple element having one surface slightly aspherical, the departure of such surface from the osculating sphere at the vertex of the surface at no point exceeding .06 F.

2. An optical objective as claimed in claim 1, in which the rear member has two convergent doublets behind the triplet, each doublet having a convergent element in front of a divergent element.

3. An optical objective as claimed in claim 2, in which in the neighborhood of the optical axis the optical power of the front member is less than one quarter of that of the rear member.

4. An optical objective as claimed in claim 3, in which the short-conjugate field of the objective corresponding to a flat long-conjugate field is spherically curved and concave towards the objective with radius of curvature between 1.0 F and 2.0 F.

5. An optical objective as claimed in claim 1, in which the rear member has a convergent doublet and a simple component behind the triplet, the doublet having a convergent element in front of a divergent element.

6. An optical objective as claimed in claim 5, in which in the neighborhood of the optical axis the optical power of the front member is less than one quarter of that of the rear member.

7. An optical objective as claimed in claim 6, in which the short-conjugate field of the objective corresponding to a flat long-conjugate field is spherically curved and concave towards the objective with radius of curvature between 1.0 F and 2.0 F.

8. An optical objective as claimed in claim 1, in which the short-conjugate field of the objective corresponding to a flat long-conjugate field is spherically curved and concave towards the objective with radius of curvature between 1.0 F. and 2.0 F.

9. An optical objective as claimed in claim 8, for use for photographic purposes, including an additional element having its rear surface shaped and positioned to correspond to the said short-conjugate field, to afford a surface against which a photographic film can be pressed.

10. An optical objective as claimed in claim 9, in which in the neighborhood of the optical axis the optical power of the front member is less than one quarter of that of the rear member.

11. An optical objective as claimed in claim 10, in which the front surfaces of all the components of the rear member are convex to the front.

12. An optical objective as claimed in claim 1, in which in the neighborhood of the optical axis the optical power of the front member is less than one quarter of that of the rear member.

13. An optical objective as claimed in claim 1, in which the front surfaces of all the components of the rear member are convex to the front.

WILLIAM MICHAEL WREATHALL.

References Cited in the file of this patent

UNITED STATES PATENTS

| Number | Name | Date |
|--------|------|------|
| 2,170,979 | Straubel | Aug. 29, 1939 |
| 2,332,930 | Rinia | Oct. 26, 1943 |
| 2,468,564 | Luneburg | Apr. 26, 1949 |
| 2,479,907 | Cox | Aug. 23, 1949 |
| 2,482,698 | Tillyer | Sept. 20, 1949 |
| 2,502,543 | Warmisham | Apr. 4, 1950 |